Figure 1A:
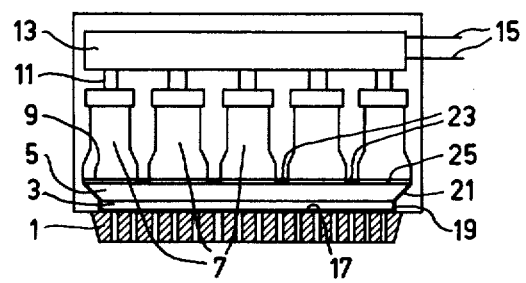

United States Patent [19]

Kieboom et al.

[11] 4,267,453
[45] May 12, 1981

[54] RADIATION DETECTION DEVICE HAVING REFLECTIVE COVER LAYERS OF BaSO₄ INCORPORATED IN ACRYLIC VARNISH

[75] Inventors: Arnoldus M. C. Kieboom; Nicolaas P. Dedding, both of Eindhoven, Netherlands

[73] Assignee: U.S. Philips Corporation, New York, N.Y.

[21] Appl. No.: 18,495

[22] Filed: Mar. 8, 1979

[30] Foreign Application Priority Data

Mar. 17, 1978 [NL] Netherlands ................. 7802916

[51] Int. Cl.³ ............................................. G01T 1/20
[52] U.S. Cl. .................................. 250/368; 250/487
[58] Field of Search ............... 250/363 R, 363 S, 367, 250/368, 483, 486, 487

[56] References Cited

U.S. PATENT DOCUMENTS

| | | | |
|---|---|---|---|
| 3,011,057 | 11/1961 | Anger | 250/363 S |
| 4,107,534 | 8/1978 | Piltingsrud | 250/368 |

*Primary Examiner*—Davis L. Willis
*Attorney, Agent, or Firm*—Thomas A. Briody; Robert T. Mayer; Paul R. Miller

[57] ABSTRACT

In order to reduce the loss of scintillation radiation which laterally emerges in radiation detector devices comprising a scintillation element, the appropriate surfaces of the scintillation element and any subsequent light conductors are provided with a suitably reflective and properly adhesive cover layer. Using a diluted acrylic varnish which incorporates BaSO₄, a cover layer having favorable adhesive properties can be obtained, the occurrence of loose paint particles in the device also being prevented.

12 Claims, 3 Drawing Figures

RADIATION DETECTION DEVICE HAVING REFLECTIVE COVER LAYERS OF BASO₄ INCORPORATED IN ACRYLIC VARNISH

The invention relates to a radiation detection device, comprising a scintillation element whose scintillation radiation is situated in a wavelength range between shortwave visible radiation and ultraviolet radiation, and a detector for recording the scintillation radiation.

A device of this kind in the form of a gamma camera is known, for example from U.S. Pat. No. 3,011,057 (H. O. Anger). In a scintillation crystal forming part of the gamma camera described therein, gamma quants having a wavelength of, for example, 9 nm are converted into radiation quants having a wavelength of, for example, between 0.6 $\mu$m and 0.2 $\mu$m. The scintillation radiation thus includes radiation having wavelengths situated in the shortwave visible range and in the adjoining ultraviolet range. The conversion of comparatively hard, and hence usually strongly penetrating, radiation into radiation whose wavelength is situated at least near the visible range is often used for the detection of comparatively hard radiation, notably in case where high sensitivity is required. For the scintillation radiation thus formed, very sensitive aids in the form of photomultipliers or semiconductor detectors are available. In order to intercept a reasonable part of the radiation quants to be measured in the scintillation crystal, the crystal is comparatively long in the radiation direction. Scintillation radiation can be generated in the crystal over its entire length. This scintillation radiation in principle uniformly spreads in all directions from the scintillation center. The aim is to measure a large as possible part of this scintillation radiation in a detector which is arranged, for example, opposite an entrance face for the radiation quants. A light conductor for the scintillation radiation is then often arranged between the scintillation crystal and the detector. Therefore, a substantial part of the scintillation radiation is liable to be lost, for example, by lateral scattering. Notably in a gamma camera, moreover, a comparatively large part of the scintillation radiation will be incident between the photomultipliers which are arranged, for example, in an hexagonal stack, and will thus also be lost for the detection.

The invention has for its object to mitigate these drawbacks; to this end, a radiation detection device of the described kind is characterized in that faces of parts of the device in which the scintillation radiation propagates are provided with a cover layer of BaSO₄ incorporated in acrylic varnish which reflects this radiation.

Thus, a substantially larger part of the scintillation radiation generated is effectively recorded in a radiation detector device in accordance with the invention, so that the sensitivity of the device is substantially increased without giving rise to unfavourable side-effects.

The radiation detector device in a preferred embodiment in accordance with the invention is formed by a gamma camera in which an entrance face as well as a jacket face of the scintillation element, and also side faces and surface areas of the light conductor which remain free between the photomultipliers, are provided with a layer of lacquer which reflects the scintillation radiation.

In a further preferred embodiment in accordance with the invention, the radiation detection device is formed by a X-ray detector which comprises scintillation elements whose appropriate surfaces are provided with a reflective layer of lacquer.

The material reflecting the scintillation radiation in accordance with the invention contains BaSO₄ for the reflection properties. The BaSO₄ is incorporated in a carrier consisting of acrylic varnish with an adapted diluent.

Some preferred embodiments in accordance with the invention will be described in detail hereinafter with reference to the accompanying diagrammatic drawing.

Figure 1B:
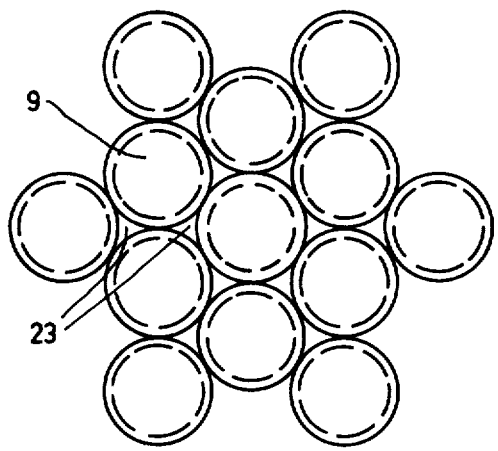
Figure 2:
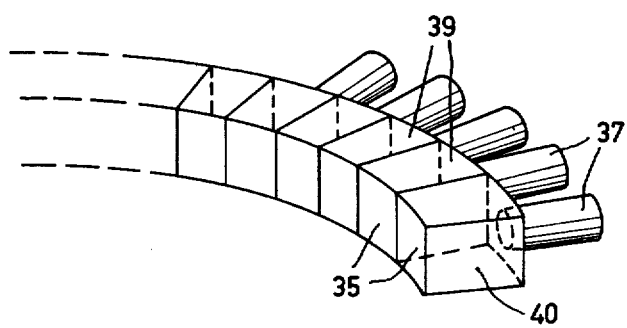

FIG. 1a shows a relevant part of a gamma camera provided with a scintillation radiation reflective lacquer layer in accordance with the invention, FIG. 1b shows a partial cross-sectional view of the entrance area in the arrangement of FIG. 1a, and FIG. 2 shows a part of an X-ray detection device which is relevant for the present invention and whose scintillation elements are provided with a reflective layer of lacquer in accordance with the invention.

FIG. 1 shows a collimator 1, a scintillation crystal 3, a light conductor 5 and an array of photomultipliers 7 with an entrance window 9, and signal output lines 11 of a gamma camera. The signal output lines 11 are coupled to a resistance network 13 which is provided with connection conductors 15 for conducting measuring signals from the individual photomultipliers to a measuring circuit (not shown). In this measuring circuit, the amplitude as well as the position of each of the scintillation pulses occurring in the scintillation crystal is determined. As a result of the use of a collimator, it is achieved in known manner that only radiation quants which are incident at least substantially perpendicularly to the crystal face 17 are admitted, so that an accurate determination of the position thereof can be performed. In accordance with the invention, in a known gamma camera of this kind a scintillation radiation reflective layer is provided on one or more of the appropriate surfaces, including the entrance face 17 of the scintillation crystal, a jacket face 19 thereof, a jacket face 21 of the light conductor and parts 23 of the surface 25 of the light conductor which is remote from the scintillation crystal situated outside the entrance windows of the photomultipliers.

The following requirements are imposed on the reflective lacquer layer. The lacquer layer should properly adhere to the scintillation crystal as well as to the light conductor, without its deposition requiring circumstances which might have an unfavourable effect on these components such as, for example, an excessive temperature. The lacquer layer may not contain components which could have any detrimental effects on the properties of the scintillation crystal during mounting or at a later stage.

The reflective properties must be favourable, particularly for scintillation light occurring. It has been found that the latter requirement is not at all satisfied by reflective lacquer layers which are white or suitably reflective in daylight.

For the use of NaI as the scintillation crystal, whose scintillation radiation has a wavelength of between approximately 0.25 $\mu$m and 0.45 $\mu$m, it has been found that the requirements imposed are well satisfied by a lacquer layer consisting of a lacquer-like substance containing BaSO₄ as the reflective material which is incorporated in a diluted acrylic varnish, the diluent containing, for example, special boiling point spirit and xylene.

A very suitable spraying lacquer for acrylic substrates such as perspex is obtained by forming a mixture of:

75 g acrylic varnish
375 g acrylic diluent
300 g BaSO₄. As a spray paint, to be provided on, for example, NaI crystals, a mixture composed on the following constituents offers good results:

20 g acrylic resin, diluted with 75 g diluent, consisting of 3 parts special boiling point spirit and one part xylene, of which subsequently 250 g is diluted with 350 g diluent and mixed with 300 g BaSO₄. For silkscreening paint for an acrylic substrate, a mixture of 320 g acrylic silkscreening varnish 3000 g BaSO₄ 729 g butyl lactate offers favourable results.

All constituents should be thoroughly mixed. The lacquer is applied preferably at a slightly increased temperature of the substrate, and can be covered against later mechanical damaging preferably by an acrylic resin paint. For the relevant scintillation radiation, reflection of more than 90% is obtained by means of these lacquer layers.

The former and the latter lacquers enable a lacquer layer to be obtained which adheres very well to materials such as glass and perspex and which are, therefore, particularly suitable for use as light conductors for the scintillation radiation and for a scintillation element made of, for example, powdery scintillation material incorporated in glass or perspex.

FIG. 2 shows an X-ray detection device which comprises an array of scintillation elements 35, and a detector 37 associated with each scintillation element. Signals from the detectors, which are, for example, a measure for the occurring absorption of the radiation, are applied to a circuit for recording and processing, (not shown). An X-ray detection device of this kind can be used, for example, for a scanning X-ray examining apparatus for medical diagnosis, for example, as described in U.S. Pat. No. 3,811,100.

Scintillation radiation generated in the scintillation elements 35, which may again consist of crystals as well as of a support with scintillation powder, in principle emerges from all six side faces of the cube structure of the scintillation elements shown. Obviously, a substantial gain in the sensitivity can again be achieved by provision of a reflective lacquer layer in accordance with the invention. An additional advantage consists in that the covering of the interfaces also leads to a substantial reduction of the cross-talk between adjacent detection channels.

When these interfaces are provided with an adhesive layer after a reflective lacquer layer has been provided thereon, the scintillation elements can be simply connected to each other, without causing risk of adverse effects from the adhesive material. In many cases the reflective lacquer layer itself may serve as an adhesive layer. Similarly, the scintillation elements may be connected to the aperture and possibly to edge portions of the photomultipliers which do not effectively intercept radiation.

What is claimed is:

1. A radiation detection device comprising scintillation means for providing scintillation radiation in a wavelength range between shortwave visible radiation and ultraviolet radiation, means for recording said scintillation radiation, and means for propagating said scintillation radiation having surface areas provided with a cover layer of BaSO₄ incorporated in acrylic varnish for reflecting said scintillation radiation.

2. A radiation detection device according to claim 1, wherein said scintillation means comprise at least one scintillation crystal having surface areas which do not face said recording means being provided with said reflective cover layer.

3. A radiation detection device according to claim 2, wherein a single scintillation crystal is provided with an adjoining light conductor, said single scintillation crystal and light conductor having surface areas free of scintillation radiation passage which are provided with said reflective cover layer.

4. A radiation detection device according to claim 3, wherein said recording means include a matrix of detectors adjoining said light conductor for passage of said scintillation radiation, said light conductor having surface areas between said detectors provided with said reflective cover layer.

5. A radiation detection device according to claim 1 or 2, wherein an X-ray source is provided for activating said scintillation means.

6. A radiation detection device according to claim 5, wherein said scintillation means comprise an array of individual scintillation elements having adjoining surfaces provided with said reflective cover layer.

7. A radiation detection device according to claim 1, wherein said cover layer comprises BaSO₄ incorporated into a diluted acrylic varnish.

8. A radiation detection device according to claim 7, wherein said diluted acrylic varnish has a diluent containing special boiling point spirit and xylene.

9. A radiation detection device according to claim 7, wherein said diluted acrylic varnish has a diluent containing butyl lactate.

10. A radiation reflective material for use in a radiation detection device comprising BaSO₄ incorporated in a diluted acrylic varnish.

11. A radiation reflective material according to claim 10, wherein said diluted acrylic varnish has a diluent containing special boiling point spirit and xylene.

12. A radiation reflective material according to claim 10, wherein said diluted acrylic varnish has a diluent containing butyl lactate.

* * * * *